Feb. 27, 1968   N. A. ROBERTS ET AL   3,370,392
MOUNTING OF LININGS FOR THERMAL INSULATION
Filed May 11, 1965   3 Sheets-Sheet 1
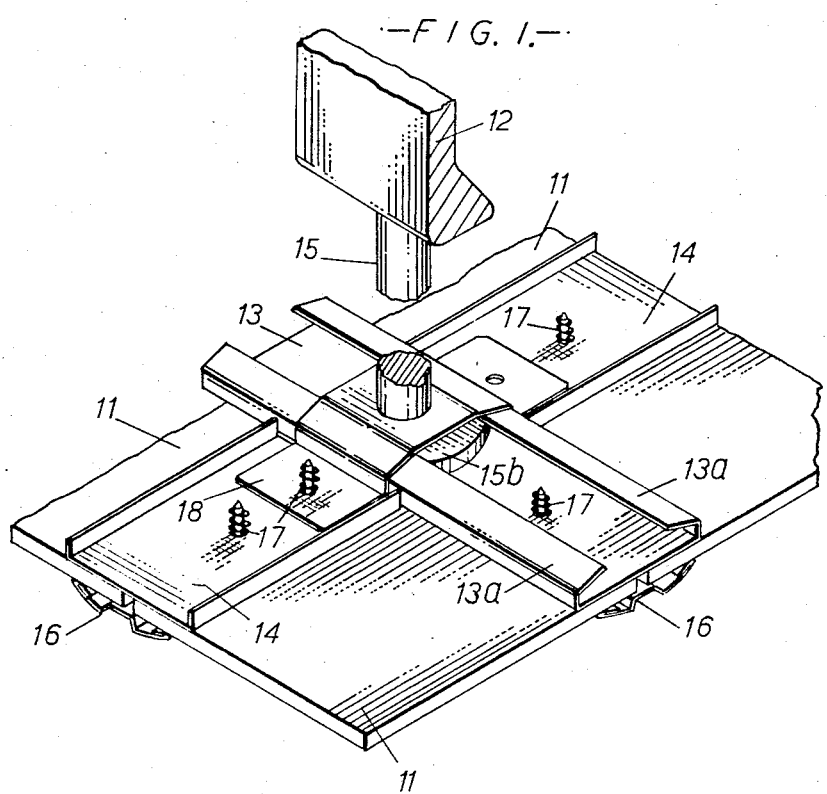
INVENTOR:
NEIL ALAN ROBERTS & WILLIAM JAMES HANNAH,
BY Amster & Rothstein
ATTORNEYS

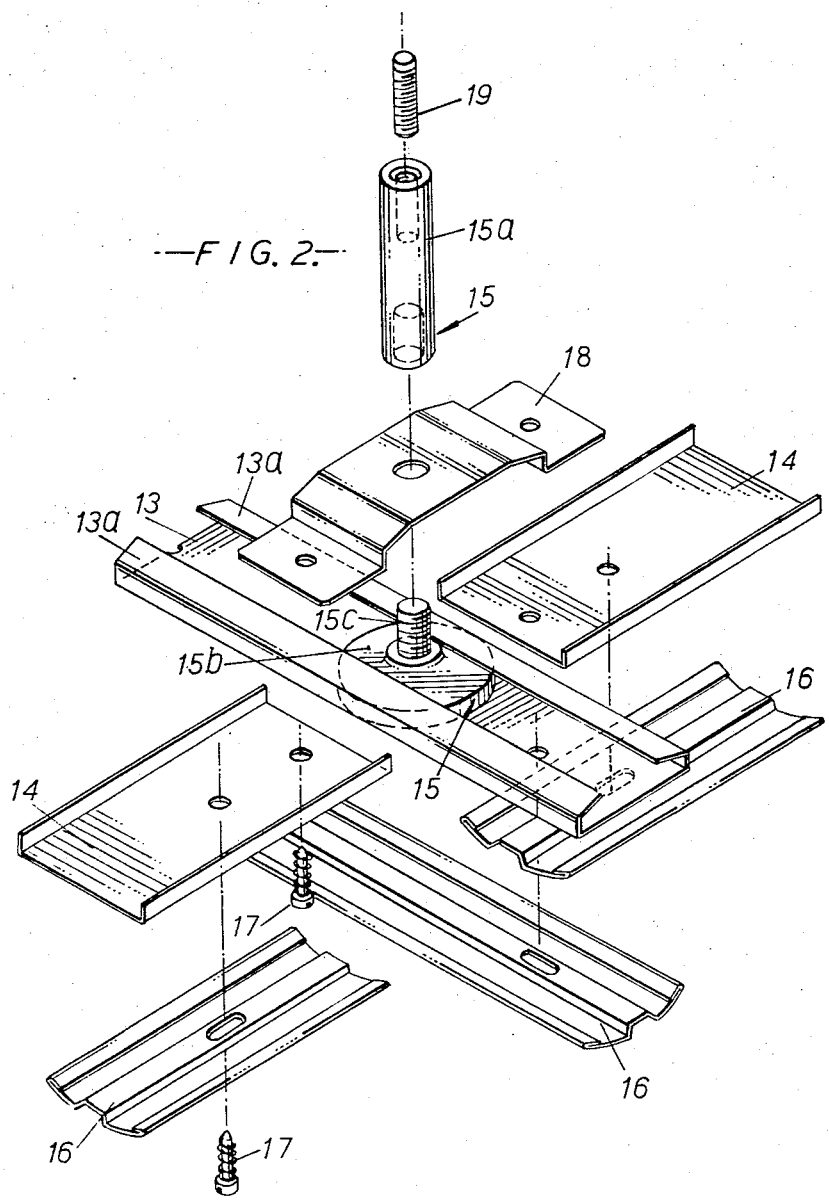

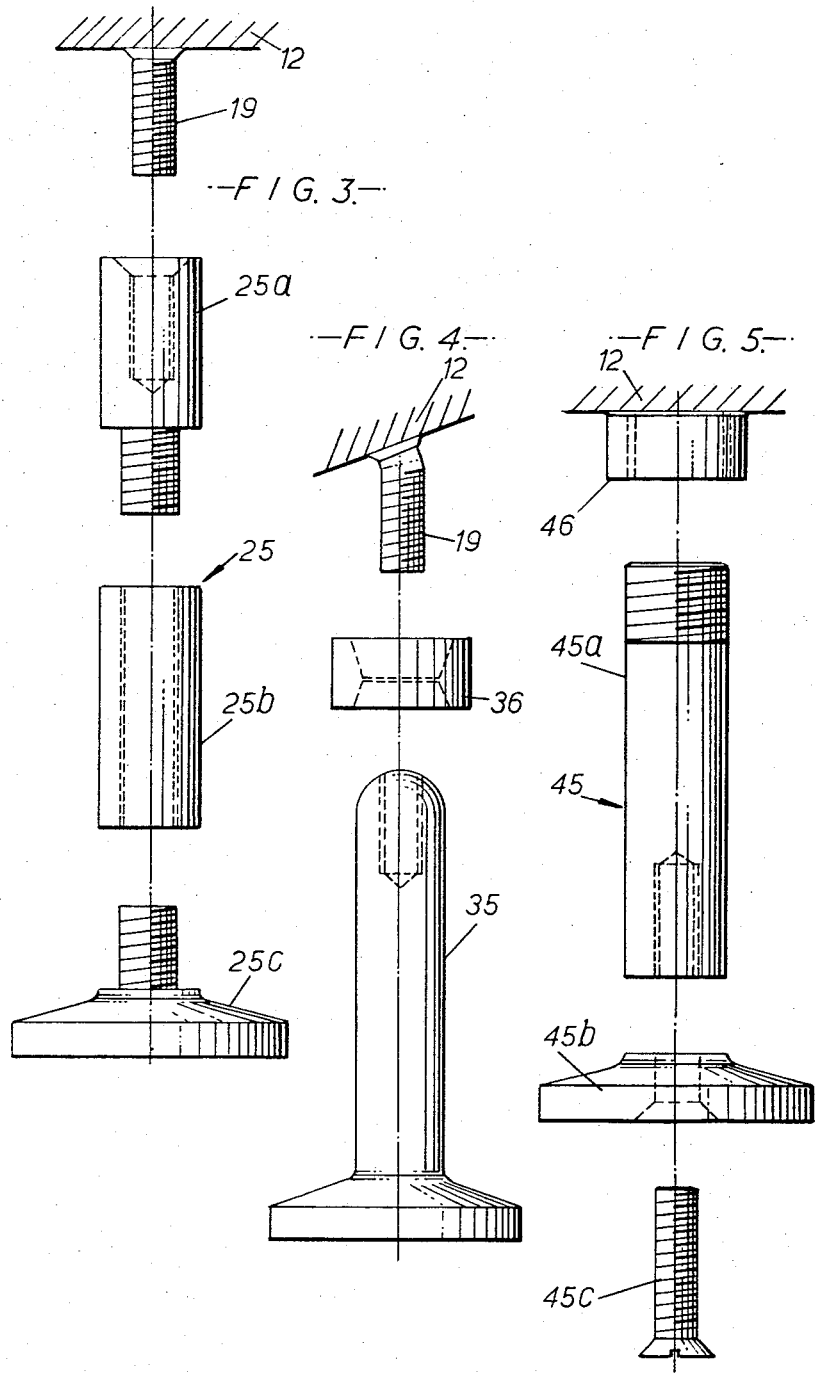

3,370,392
MOUNTING OF LININGS FOR THERMAL
INSULATION
Neil A. Roberts, Formby, and William J. Hannah, Liverpool, England, assignors to The Mersey Insulation Company Limited, Bootle, England
Filed May 11, 1965, Ser. No. 454,941
10 Claims. (Cl. 52—479)

ABSTRACT OF THE DISCLOSURE

A framework supporting insulation panels in a clearance position from a structural surface wherein the structural surface has non-metallic spacing pieces each terminating in first mounting flanges. The framework includes U-shaped supporting strips fitted on the first mounting flanges and retaining strips secured by screws to said supporting strips with the insulation panels firmly sandwiched therebetween, the screws passing through a clearance left between the edges of adjacent insulation panels.

The present invention concerns the mounting or suspension of the panels lining the insulation medium on structural surfaces.

An object of the present invention is to provide a rational system of mounting elements for attaching lining panels in a sealable manner at a predetermined distance from the structure and in such a manner that the panels are thermally insulated from the structure.

According to the present invention a support framework for the mounting or suspension of insulation lining panels at a predetermined distance from the structural surfaces of a chamber, comprises a plurality of interconnected support strips attached to the structure via a plurality of non-metallic spacing pieces, the lining panels being held with the edge regions of their inner surfaces in contact with the outer surfaces of the support strips by retention strips externally bridging the joints between adjacent panel edges and urged towards the support strips by securing means.

The support strips and the retention strips are preferably provided with a series of holes at spaced intervals along their length, preferably along the centre line. Through these holes the securing means, preferably in the form of screws, may be passed to serve two functions. Firstly the holes in the support strips are used to accommodate screws urging the retention strips towards the support strips. Secondly at intervals screws interconnect, via connecting straps, the strips of the support framework. The holes in the retention strips are preferably elongated longitudinally of the strips to compensate for any slight inaccuracies in the relative positions of the holes in the support and retention strips.

The support strips, the interconnecting straps and the retention strips may be of metal. The retention strips may be of U-section with side flanges of small depth directed inwardly and the support strips may be of a similar shape to these retention strips but with a pair of secondary flanges of small depth at the top of the side flanges and directed towards the centre line of the strip.

Alternatively, the retention strips may have a generally arcuate cross-section, and preferably also have a central longitudinal groove to accommodate the screw heads, these retention strips being secured in position with their convex surfaces facing outwardly. This preferred retention strip reduces the risk of damage to the framework by eliminating the side flanges which may be caught and damaged during movement of goods within the chamber, whilst also improving the appearance of the completed structure.

The form of interconnecting strap is a U-section with small side flanges directed outwards and with further small secondary flanges at the extremity of the side flanges directed away from the centre line of the straps. Holes may be made in the secondary flanges to receive the interconnecting screws.

One form of spacing piece comprises a cylinder with a tapped axial bore at its inner end for securing to an externally threaded spigot projecting from the structure, the outer end of the cylinder also having a tapped axial bore for receiving a flanged member provided with an externally threaded axial projection.

An alternative form of spacing piece comprises a cylinder with a tapped axial bore at its inner end, i.e. the end adjacent to the structure, and with the outer end threaded externally to receive a flanged nut, so positioned that its outer surface, that is the surface farthest from the structure, is flush and without projection. The spacing piece and flanged nut are preferably of material of low thermal conductivity and sufficient strength such as a rigid plastics material such as poly-vinyl chloride. Where a great number of constant depth spacing pieces are required it may be found convenient to delete the external thread on the outer end of the spacing piece and form the flanged end and spacing piece as one, by a process such as injection moulding, or turning from solid.

Connection between the spacing pieces and the support strips is effected by sliding the support strips over the flange of the spacing pieces so that each flange is contained between the bottom of a support strip and the secondary flanges, lateral movement being prevented by the side flanges of the support strips.

It will be appreciated that, in some instances, it will not be necessary to provide spacing pieces to connect with every support strip of a framework, and hence the support strips not so connected may be of a simple U-section without the secondary flanges.

In some cases it may be necessary for the joints in the insulation linings to be airtight and in this case sealing tape or mastic is placed between the inner edge of the lining panels and the outer edge of the support strips.

The invention will now be described further, by way of example, with reference to the accompanying drawings, in which:

FIG. 1 is a rear view of an assembled framework in accordance with the invention;

FIG. 2 is an exploded view of FIG. 1; and

FIGS. 3 to 5 each show an exploded side elevation of alternative forms of spacing piece for attaching the framework to a structure.

As shown in the drawings, insulation lining panels 11 are mounted at a predetermined distance from a structural member 12 of a chamber by means of a support framework comprising a plurality of interconnected support strips 13, 14 attached to the structure 12 by means of a plurality of non-metallic spacing pieces 15. The panels 11 are held with the edge regions of their inner surfaces in contact with the outer surfaces of the support strips 13, 14 by means of retention strips 16 which externally bridge the joints between adjacent panel edges.

The support strips 13, 14 and the retention strips 16 are each provided with a series of holes at spaced intervals along their length, preferably along the centre line. Securing means, in this instance screws 17, are passed through these holes to urge the retention strips 16 towards the support strips 13, 14 between which the panels 11 are thus secured. Additionally, some of these screws 17 interconnect, via connecting straps 18, the support strips 13, 14.

The support strips 13 are preferably of U-section with a pair of secondary flanges 13a extending towards the centre line of the strip from the top of the side flanges.

The form of spacing piece 15 shown in FIGS. 1 and 2 of the drawings, comprises a cylinder 15a with a tapped axial bore at one end for securing to an externally threaded spigot 19 projecting from the structure 12, spigots 19 having been welded or otherwise secured at intervals to the structure. A further tapped axial bore is provided at the other end of cylinder 15a for receiving a flanged member 15b having an externally threaded axial projection 15c. Connection between the spacing pieces 15 and the support strips 13 is effected by sliding the support strip 13 over the flange 15b so that it is contained between the bottom of the support strips 13 and the secondary flanges 13a, lateral movement being prevented by the side flanges of the support strip 13.

Although all the support strips of such a framework may be of type 13, i.e. having secondary flanges 13a, it will be appreciated that in many instances where sufficient rigidity of the framework can be achieved without the necessity of providing spacing pieces to connect with every support strip, some of the support strips may be of a simple U-section, thus dispensing with the secondary flanges.

As evident from FIG. 2 the interconnecting straps 18 may be provided with a central bore in the bottom of their U-section, which bore is sufficiently large for the threaded projection 15c of the flanged member 15b to be passed therethrough prior to screwing into the cylinder 15a, the arrangement being such that the straps 18 are held between the flanged member and the cylinder.

An alternative form of spacing piece, generally denoted 25, is shown in FIG. 3 and consists of three parts, namely, an attachment member 25a, a cylindrical portion 25b and a flanged member 25c. The attachment member 25a has a tapped axial bore at its inner end for securing to an externally threaded spigot 19 projecting from the structure 12 and an externally threaded portion at its other end for receiving one end of the cylindrical member 25b which is internally threaded.

This internal thread preferably extends the full length of the cylinder 25b so as to accommodate at its outer end the flanged member 25c which has a corresponding externally threaded axial projection. This arrangement has the advantage that the cylindrical portion 25b may be made to any convenient length and subsequently cut to the required size on site.

In some instances it may be necessary to mount the lining panels at an angle with the structure 12, for example, when suspending panels below roof trusses or where irregularities or complications arise in the structural surfaces of the chamber. To facilitate mounting in these circumstances a spacing piece 35 (FIG. 4) having a hemispherically shaped inner end may be mounted on a spigot 19 as before, but with the interposition of a washer 36 between the structural member 12 and the spacing piece 35. The washer 36 has a waisted bore which allows the spacing piece 35 to assume its own seating attitude within the washer. Such a washer may have a coved bore corresponding in curvature to the hemispherical end of the spacing piece. It will be appreciated that although the spacing piece 35 is illustrated in FIG. 4 as having an integrally formed flanged portion, any of the previously mentioned spacing pieces may be provided with a hemispherically shaped inner end and used in conjunction with a washer such as washer 36.

FIG. 5 illustrates a further embodiment of spacing piece generally denoted 45. In this embodiment the cylindrical portion 45a is externally threaded at its inner end for securing to an internally threaded collar 46 welded or otherwise secured to the structure 12. At its outer end the cylindrical portion 45a has a tapped axial bore for receiving a flanged member 45b by means of a screw or bolt 45c which passes through a central bore of the flanged member 45b.

The spacing pieces are of a non-metallic material, preferably of low thermal conductivity such as rigid P.V.C. or the like.

We claim:

1. A support framework for mounting and suspending of a plurality of insulation lining panels in juxtaposed relationship and at a predetermined distance from the structural surfaces of a chamber, said lining panels having an inner surface and an outer surface relative to the structural surfaces of the chamber and having joints between adjacent panel edges, said framework comprising a plurality of non-metallic spacing pieces each having an inner end attached to said chamber structural surface and an outer end having a first mounting flange thereon, support strips each having a U-shaped body formed by a main body wall, side walls, and a pair of secondary mounting flanges on said side walls and extending towards each other, said support strips each having an inner surface and an outer surface relative to the structural surfaces of the chamber and operatively mounted on said spacing pieces with said outer surface outermost and said first mounting flange disposed behind said secondary flanges, each of said lining panels being operatively arranged with at least two edge regions of its inner surface in contact with the outer surfaces of at least two of said support strips, retention strips operatively arranged to externally bridge the joints between adjacent panel edges, said support strips and said retention strips each being provided with a plurality of holes at spaced intervals along their length accommodating a plurality of securing means for urging said retention strips towards said support strips.

2. A framework according to claim 1, wherein each retention strip has a U-shaped body formed by a main body wall and side flanges and is secured in position with the side flanges directed towards the lining panels.

3. A framework according to claim 1, wherein each retention strip has a generally arcuate cross section with a central longitudinal groove for accommodating the heads of the securing bolts, the holes in said retention strip, through which said bolts pass, being elongated in the longitudinal direction of the strip, said retention strip being secured in position with its convex surface facing away from the lining panels.

4. A framework according to claim 1, wherein the support strips are interconnected by means of interconnecting straps, each interconnecting strap comprising a U-section with side flanges of small depth and secondary flanges provided at the extremity of the side flanges extending away from the center line of the strap, the secondary flanges of said interconnecting straps having holes receiving the securing means.

5. A framework according to claim 1, wherein the spacing pieces each comprise a cylinder having tapped axial bores in its inner and outer ends.

6. A framework according to claim 1, wherein the spacing pieces each comprise a cylinder having a tapped axial bore at its inner end and an externally threaded outer end.

7. A framework according to claim 1, wherein said chamber structural surface has externally threaded spigots and the spacing pieces each comprise an attachment member having a tapped axial bore at its inner end threadably engaging one said externally threaded spigot, the outer end of the attachment member having an externally threaded portion receiving one end of an internally threaded cylinder, said first mounting flange is disposed on the remote end of the cylinder.

8. A framework according to claim 1, wherein the spacing pieces each comprise a cylinder having a tapped axial bore at its inner end and said first mounting flange integrally formed on said outer end.

9. A framework according to claim 7 wherein the inner end of each cylinder is hemispherically shaped and has an axial bore threadably engaging one said externally threaded spigot, and including a washer having a waisted bore operatvely arranged on said spigot before said spacing piece is threadably engaged thereon.

10. A framework according to claim 1, wherein the spacing pieces each comprise a cylinder having an externally threaded inner end and a tapped axial bore at its outer end.

References Cited
UNITED STATES PATENTS

| | | | |
|---|---|---|---|
| 2,347,756 | 7/1944 | Swenson | 52—483 X |
| 2,684,171 | 7/1954 | Ernst | 220—15 |
| 2,698,071 | 12/1954 | Lee | 52—484 |
| 2,879,660 | 3/1959 | Reintjes | 52—589 |

JOHN E. MURTAGH, *Primary Examiner.*